United States Patent [19]

Danko et al.

[11] 4,201,366
[45] May 6, 1980

[54] BELLOWS VALVE

[76] Inventors: Oliver L. Danko, 12184 Heath Rd., Chesterland, Ohio 44026; Bernard J. Gallagher, 6665 Gates Mills Blvd., Gates Mills, Ohio 44040; Earl D. Shufflebarger, 6609 Berkshire Dr., Mentor, Ohio 44060; David M. Simko, 6467 Huntington Dr., Solon, Ohio 44139; Edward E. Kish, 7380 Raccoon Hill, Kirtland, Ohio 44094

[21] Appl. No.: 886,031

[22] Filed: Mar. 13, 1978

[51] Int. Cl.² ............................................. F16K 41/10
[52] U.S. Cl. .............................. 251/335 B; 137/329.01
[58] Field of Search .............. 251/214, 335 R, 335 B; 137/329.01

[56] References Cited

U.S. PATENT DOCUMENTS

| | | | |
|---|---|---|---|
| 999,329 | 8/1911 | Mehring | 251/335 |
| 1,294,491 | 2/1919 | Lavigne | 251/335 |
| 1,360,833 | 11/1920 | Vuilleumer | 251/335 B |
| 1,494,910 | 5/1924 | Hench | 251/335 A |
| 1,527,154 | 2/1925 | Mallory et al. | 251/335 B |
| 1,906,313 | 5/1933 | Clifford | 251/335 B |
| 1,996,309 | 4/1935 | Simpson | 251/335 B |
| 2,001,251 | 5/1935 | Irving | 251/335 B |
| 2,061,028 | 11/1936 | Forbes et al. | 251/335 A |
| 2,145,575 | 1/1939 | Zwickl | 251/335 B |
| 2,463,921 | 3/1949 | Titcomb | 251/335 B |
| 2,617,621 | 11/1952 | Hobbs | 251/335 B |
| 2,628,638 | 2/1953 | Herod et al. | 251/335 B |
| 2,682,386 | 6/1954 | Lindsay | 251/335 B |
| 2,888,037 | 5/1959 | Jones et al. | 251/335 B |
| 3,206,165 | 9/1965 | Salmon et al. | 251/335 B |
| 3,278,156 | 10/1966 | Callahan, Jr. et al. | 251/335 B |
| 3,295,191 | 1/1967 | Gallagher et al. | 251/335 B |
| 3,528,087 | 9/1970 | Perkins | 251/335 B |
| 3,787,023 | 1/1974 | Shufflebarger et al. | 251/335 B |
| 3,844,307 | 10/1974 | Soury et al. | 251/335 B |

FOREIGN PATENT DOCUMENTS 571561 3/1959 Belgium ............................ 251/335 B Primary Examiner—William R. Cline
Assistant Examiner—H. Jay Spiegel
Attorney, Agent, or Firm—Fay & Sharpe

[57] ABSTRACT

A bellows valve construction which facilitates valve use at elevated temperatures and pressures. The valve includes a valve body having a passageway extending thereinto for defining a valve chamber with a valve seat disposed along this passageway and a fluid inlet and a fluid outlet communicating therewith on opposite sides of the seat. A bonnet is integrally associated with the valve body and includes a bonnet opening coaxial with the valve body passageway. A valve assembly is receivable as a unit in the bonnet opening with a portion thereof extending into the valve chamber for selectively controlling fluid flow between the fluid inlet and outlet. This valve assembly is removable from the valve body as a unit for repair or replacement purposes and includes an adapter nut threadedly receivable in the bonnet opening, a valve member, an elongated stem, and a hollow bellows passing through the bonnet opening in a surrounding relationship with at least a portion of the stem. One end of the bellow is affixed to the adapter nut with the other end being affixed adjacent the valve member such that fluid passing through the valve exerts a compressive force against the bellows. A first urging means is adapted to selectively move the valve stem and member into a valve opened condition and a second urging means is adapted to move the valve stem and member into a valve closed condition. The valve is adapted for either manual or remote operation.

30 Claims, 8 Drawing Figures

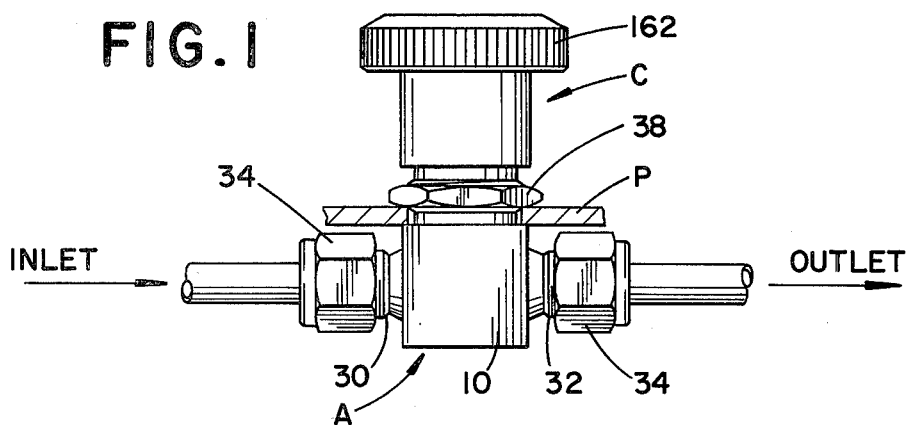
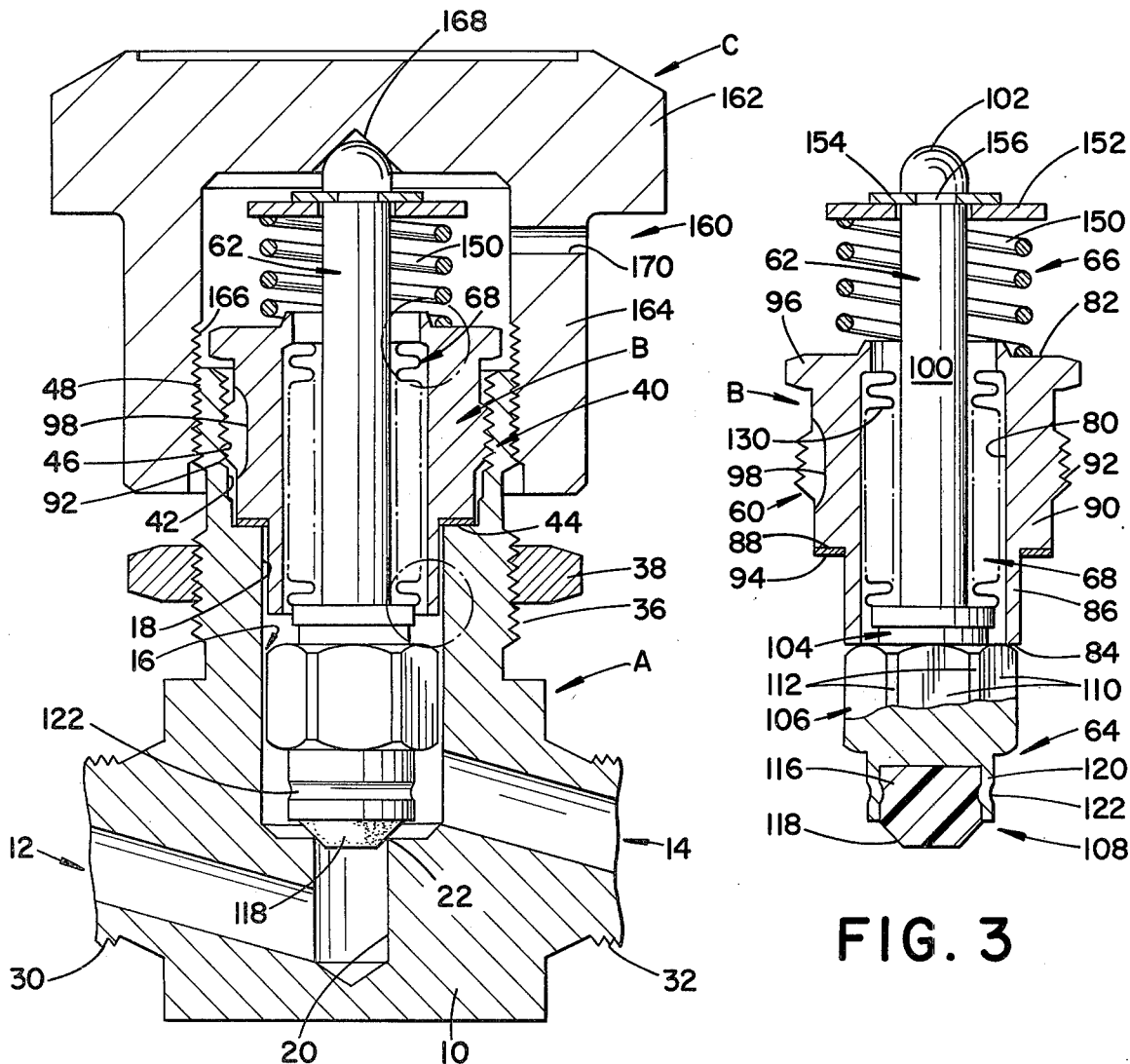

BELLOWS VALVE

BACKGROUND OF THE INVENTION

The present development relates to valves and more particularly to valves of the type commonly referred to as bellows valves.

The development is particularly applicable to an inverted bellows valve and will be described with particular reference thereto. The development provides an improved bellows valve structure as compared with those structures disclosed particularly in the commonly assigned U.S. Pat. Nos. 3,278,156 and 3,787,023.

Characterized by a bellows component serving to seal off the interior of the valve from the atmosphere and at the same time, to accommodate movements of the valve stem during the operating cycle, bellows valves have found increasingly wide acceptance. In principle, the bellows valve concept presents notable advantages in so-called "closed system" applications involving the handling of corrosive and/or hazardous fluids at high temperatures and pressures. Most known prior art bellows valves have, however, failed for various reasons to meet or exceed the rising standards imposed by increasingly sophisticated systems.

The bellows valve structure and method of assembly disclosed in the aforementioned commonly assigned U.S. Pat. Nos. 3,295,191 and 3,278,156 have proved to be valuable advances in the state of the art, although it has been found desirable to improve the basic design for purposes of permitting valve use in higher pressure and temperature applications than has heretofore been possible. It has further been found desirable to improve the basic valve design in a manner which would facilitate use of a so-called soft seat material to allow for valve control by either conventional handle means or by remote actuator means and to also provide a valve design which would permit the internal valving components to be readily removed from the valve body for repair or maintenance purposes.

The subject new design is deemed to fully meet these needs and provide a new and improved bellows valve structure yielding improved operational results through a wider range of pressure and temperature applications.

BRIEF DESCRIPTION OF THE INVENTION

In accordance with the present invention, there is provided a bellows valve arrangement having a valve body including a passageway extending thereinto for defining a valve chamber. A valve seat is disposed along the passageway and a fluid inlet and a fluid outlet communicate with the passageway on opposite sides of the valve seat. A bonnet portion is associated with the valve body and includes a bonnet opening coaxially disposed with the passageway. A valve assembly is receivable as a unit in the bonnet opening and includes a portion thereof extending into the valve chamber for selectively controlling fluid flow between the fluid inlet and outlet. This valve assembly includes an adapter, a valve member, a valve stem, and an open ended hollow bellows. The adapter has inner and outer ends and is dimensioned to be closely received in the bonnet opening in a sealing relationship therewith. The adapter also includes an opening extending therethrough from the outer end to the inner end coaxial with the valve chamber. The valve stem extends through the adapter opening and is elongated to have an outer end spaced outwardly from the adapter outer end. The stem inner end carries the valve member thereon and the valve member is cooperable with the adapter inner end for defining a maximum spaced position for the valve member from the valve seat. The bellows also passes through the adapter opening in a surrounding relationship with a portion of the stem. One end of the bellows is affixed to the adapter around the adapter opening adjacent the adapter outer end with the outer end being affixed to the valve stem adjacent the valve member thereby to close the adapter opening and isolate the stem from fluid contact and the wetted parts of the valve from the atmosphere. A first urging means is employed for selectively urging the stem axially outward of the adapter and consequently outward of the valve chamber away from the valve seat. A second urging means is provided for selectively urging the stem and valve member axially inward into the valve chamber so that the valve member may be moved into engagement with the valve seat to thereby close the valve and prevent fluid flow therethrough.

In accordance with another aspect of the new and improved design, the bonnet opening has a diameter greater than the diameter of the passageway with the bonnet opening and passageway merging at a radially disposed circumferential bonnet shoulder. The adapter has an innermost portion including the adaptor inner end closely received in the passageway and a main adapter body closely received in the bonnet opening. The adapter innermost portion and main body merge at a radially disposed circumferential adapter shoulder adapted to closely mate with the bonnet shoulder. Seal means is disposed between the adapter and bonnet shoulders to prevent fluid flow from the valve therepast.

In accordance with yet another aspect of the subject new and improved bellows valve, the first and second urging means comprise spring biasing means and a handle to facilitate manual valve operation or operative portions of an actuator device to facilitate remote valve operation.

According to a further aspect of the subject new and improved bellows valve, the valve member includes a separate valve plug or insert member retained by the valve member and which plug is adapted to selectively engage the valve seat for closing the valve.

In accordance with a still further aspect of the subject new and improved bellows valve design, the bellows includes connecting flange areas at the opposite ends thereof. One of these flange areas is welded to the adapter nut and the other flange is welded to the valve stem adjacent the valve member.

One advantage in the subject new design is the provision of a new and improved bellows valve which is adapted to use in higher pressure applications.

A further advantage to the subject new design is the provision of a new and improved bellows valve in which the valve assembly is readily removable from the valve body for repair or replacement purposes.

Another advantage to the subject new and improved bellows valve design is that it permits the valve member to be constructed from a non-metal material which is softer than the valve seat itself for eliminating metal to metal sealing contact.

A still further advantage in the structure of the subject new and improved bellows valve is the provision of an arrangement which is readily adapted to actuation by conventional handle means or by so called remote actuators.

Other advantages and benefits for the subject new design will become readily apparent to those skilled in the art upon a reading and understanding of the specification.

BRIEF DESCRIPTION OF THE DRAWINGS

The invention may take physical form in certain parts and arrangements of parts, a preferred and alternative embodiments of which will be described in detail in the specification and illustrated in the accompanying drawings which form a part hereof and wherein:

FIG. 1 is a side elevational view of the subject new bellows valve;

FIG. 2 is an enlarged view of the valve shown in FIG. 1 with portions thereof shown in cross-section for ease of illustration;

FIG. 3 is a view of the valve assembly shown in FIG. 2 with additional portions thereof shown in cross-section for ease of illustration;

DESCRIPTION OF PREFERRED AND ALTERNATIVE EMBODIMENTS

Figure 4:
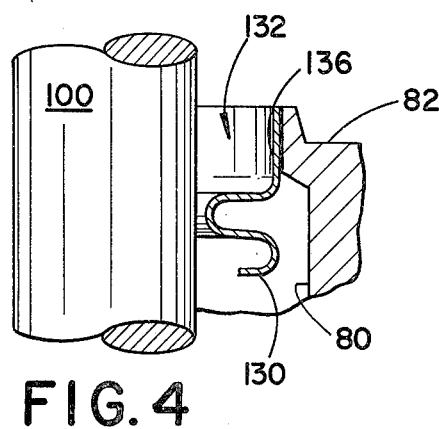
FIG. 4 is an enlarged view of the upper circled area in FIG. 2.

Referring now to the drawings wherein the showings are for purposes of illustrating the preferred and alternative embodiments of the development only and not for purposes of limiting same, the FIGURES show a bellows valve structure having a valve body A, a valve assembly B and valve control means C.

More particularly, and with reference to FIGS. 1–3, the valve body includes a generally cubed body portion 10 having an area defining an inlet passage 12 and an area defining an outlet passage 14 both communicating with a cylindrical valve chamber 16. Chamber 16 is defined by a passageway extending inwardly into body portion 10 from an open upper end 18 toward a closed lower end 20. Inlet and outlet passages 12, 14 communicate with a valve chamber on opposite sides of a valve seat 22 formed therein.

Threaded extension areas 30, 32 extend outwardly from opposite sides of body portion 10 and have passages 12, 14 passing therethrough. These threaded areas are adapted to receive conventional tube or pipe fittings generally designated 34 in FIG. 1 for connecting the valve into a fluid system. External threaded area 36 disposed on the upper surface of the valve body is adapted to receive a jam nut 38 for conveniently panel mounting the valve structure to a panel P as shown in FIG. 1.

A bonnet generally designated 40 is integral with and extends upwardly from body portion 10 to include a bonnet opening 42 coaxially disposed with valve chamber 16. Bonnet opening 42 has a larger diameter than does valve chamber 16 with the opening and chamber meeting at a radially extending circumferential bonnet shoulder 44. The function of shoulder 44 will be described in greater detail hereinafter. Extending axially inward from the outer open end of bonnet opening 42 are internal threads 46 and extending axially inward from the outer end of bonnet 40 are external threads 48.

While valve body 48 could be constructed from any number of materials, in the preferred embodiment here under discussion, brass is advantageously employed. However, stainless steel and the like could also be employed to accommodate valve use in different or special environments without in any way departing from the overall intent or scope of the present development.

In the manually operated valve construction here under discussion, valve assembly B is generally comprised of an adapter nut 60, a valve stem 62, a valve member 64, a biasing means 66 and a bellows 68. This valve assembly is best shown in an installed position in FIG. 2 and by itself in FIG. 3. The arrangement of the valve assembly itself and the cooperative relationships when it is received in the valve body are deemed to provide improved structural and operational benefits than have heretofore been obtainable with prior art valves of this general type.

More particularly, adapter nut 60 has an adapter nut opening 80 passing therethrough from an outer end face 82 to the inner end 84 thereof. When the adapter nut is in position in the valve body as shown in FIG. 2, opening 80 is coaxially disposed with valve chamber 16 and bonnet opening 42. A sleeve-like portion 86 extends from adapter nut inner end 84 toward adapter nut outer end face 82 and merges at a radially disposed circumferential adapter nut shoulder 88 with upper adapter nut portion 90. Sleeve-like portion 86 is dimensioned to be closely slidably received in valve chamber 16 and adapted nut shoulder 88 is dimensioned to cooperate with bonnet shoulder 44 in a manner to be described. Upper adapter nut portion 90 includes an external threaded area 92 thereon adapted to threadedly cooperate with internal threads 46 in bonnet opening 42. A generally flat seal ring 94 is adapted to be closely received over sleeve-like portion 86 against shoulder 88 as best shown in FIG. 3. When valve assembly B is inserted into valve body A as shown in FIG. 2, the seal ring is captured between shoulders 44, 48 to facilitate fluid sealing between valve assembly B and valve body A. A radially outwardly extending circumferential flange 96 is disposed about upper adapter nut portion 90 at outer end face 82 thereof to facilitate ease of installation of the valve assembly in the valve body. To this end, flange 96 has a polygonal configuration to provide convenient wrench flats. A groove 98 is included in adapter nut portion 90 to extend longitudinally along threaded area 92. This groove facilitates convenient leak testing of seal ring 94.

In the preferred embodiment here under discussion, adapter 60 is constructed from bronze and seal ring 94 is constructed from KEL-F or the like. Other types of materials could also be advantageously employed without in any way departing from the overall intent or scope of the development. Indeed, and as to seal ring 94, other materials more compatible with the fluid system in which the valve is to be used could well be more desirably employed.

Valve stem 62 is comprised of an elongated shaft 100 dimensioned to extend through the adapter nut and protrude outwardly from both ends thereof and including a domed outer end 102 and a flanged inner end 104. Valve member 64 is disposed at stem inner end 104 and is comprised of a guide portion 106 and a valve portion or plug 108. Guide portion 106 has a generally polygonal cross-section comprised of a plurality of alternating sides 110 and transition zones 112. In the preferred arrangement, the guide member is dimensioned to be fairly closely slidably received in valve chamber 16 and has a generally hexagonal configuration although other configurations could also be advantageously employed. This provides for equal guiding and piloting of valve member 64 as well as a reduction in the amount of contact with the chamber side wall to thereby reduce rubbing and the like. The polygonal configuration further provides a good "pump down" feature for the valve.

Valve portion or plug 108 is comprised of a cylindrical body 116 having a frusto-conical end area 118 with a substantial portion of body 116 received in a blind sleeve-like cavity 120 included at the innermost end of the valve member at guide portion 106. Frusto-conical area 118 is dimensioned so that it may be selectively received against valve seat 22 (FIG. 2) for purposes of controlling fluid flow through the valve. An inwardly rolled area 122 extends circumferentially around sleeve-like cavity 120 for retaining valve portion 108 in position in cavity 120.

In the preferred arrangement here under discussion, stem 62 and guide member portion 106 of valve member 64 are constructed from bronze with valve portion 108 being constructed from KEL-F or the like. Other materials could also be advantageously employed without in any way departing from the overall intent or scope of the development for accommodating particular valve applications and be compatible with the system fluid.

Figure 5:
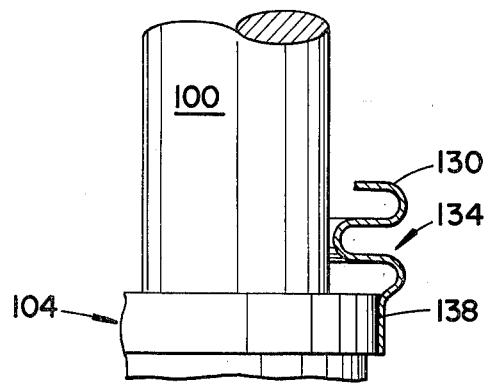
FIG. 5 is an enlarged view of the lower circled area in FIG. 2.

Bellows 68 has a hollow open ended accordian-like configuration. In the preferred arrangement, the bellows is constructed from bronze and includes a bellows body 130 having an outer end 132 and an inner end 134. As best shown in FIGS. 4 and 5, a first flange area 136 is provided at the bellows outer end and a second flange area is provided adjacent the bellows lower end. As with prior designs, the bellows is designed to prevent valve leakage and replaces the more conventional stem packing seal arrangements. The diameter of bellows body 130 is such that it may be received through adapter nut opening 80 and be expanded and contracted without causing any interference relationship between the bellows and the side walls of the opening. In FIG. 4, it will be seen that flange area 136 is closely received against the side wall of adapter nut opening 80 adjacent outer end face 82. The bellows upper end is retained in this position by known inert welding techniques to eliminate use of brazing or soldering which has been widely utilized heretofore. Because of the use of inert welding techniques, there is no residue from flux or the like formed when using brazing or soldering which could contaminate the fluid system when the valve is placed into actual use. FIG. 5 shows flange area 138 at bellows lower end 134 being closely received against the outside surface of flanged stem inner end 104. The bellows lower end is retained in this position by the same inert gas welding techniques discussed above and the specifics of the inert gas welding techniques may vary if desired to accommodate valve applications. With the bellows so installed, a portion of elongated stem shaft 100 is sealingly surrounded thereby.

Referring particularly again to FIG. 3, biasing means 66 comprises a compression spring 150 interposed between a flat retaining washer 152 and outer end face 82 of the adapter nut. A conventional snap ring or the like 154 is received in groove 156 for retaining washer 152 in position. As shown in FIG. 3, spring 150 acts against washer 152 continuously to urge the stem and valve member outwardly of the adapter nut until inner end 84 thereof is engaged by the upper surface of the valve member as defined by guide portion 106.

Referring again to FIG. 2, the entire valve assembly B is mounted in valve body A by means of threaded engagement between internal threads 46 on bonnet opening 42 and external threads 92 on the upper adapter nut portion. The adapter nut is threadedly advanced into the bonnet opening until shoulders 44, 88 compressingly engage seal ring 94 so as to provide a fluid tight relationship therebetween. As noted above, bellows 68 seals the stem area. Once so installed, stem 62 may be moved inwardly or outwardly of the adapter nut to cause a corresponding movement of the valve member in valve chamber 16 for controlling fluid flow through the valve. In the arrangement shown in FIG. 2, frusto-conical area 118 of the valve portion or plug is in engagement with valve seat area 22 for preventing fluid flow from inlet passage 12 to outlet passage 14. If desired, flange 96 of adapter nut 60 may be brazed to the outer end face of bonnet area 40 when an hermetically sealed valve is desired. Since the soft valve portion or plug is spaced from this area, no heat damage will be imparted thereto.

To accommodate selective opening and closing of the valve, valve control means C is provided. In the arrangement shown in FIGS. 1 and 2, this means comprises a knob or handle member 160 having a radially outward flanged portion 162 and a hollow cup-shaped main body portion 164. This hollow cup-shaped body portion includes internal threads 166 adapted to threadedly mate with external threads 48 on bonnet area 40. Also, a conical recess 168 cooperates with domed outer end 102 of stem shaft 100 and a fluid test port 170 communicates through the side wall of body portion 164. As knob 160 is threadedly advanced onto the bonnet area, the outward urging force of spring 150 is overcome and the valve stem and valve member are directed inwardly into valve chamber 16 until frusto-conical area 118 of the valve portion or plug engages valve seat 22. As the knob is threadedly retracted from the bonnet area, spring 150 causes the stem and valve member to be moved axially outward through the valve chamber and permit fluid flow from inlet passage 12 to outlet passage 14. Due to the relationship between conical area 168 of the knob and the domed configuration of the stem outer end 102, threaded movement of the knob relative to the bonnet area causes only translatory movement of the stem and valve member without appreciable torque transmission so as to not disturb or destroy the bellows or its mounted relationship at the opposite ends thereof. In the preferred arrangement, the stem and valve member stroke may be in the range of only 1/16" or so. When the valve member requires maintenance or replacement, it is simply necessary to remove the entire valve assembly B from valve body A for easy access thereto.

Figure 6:
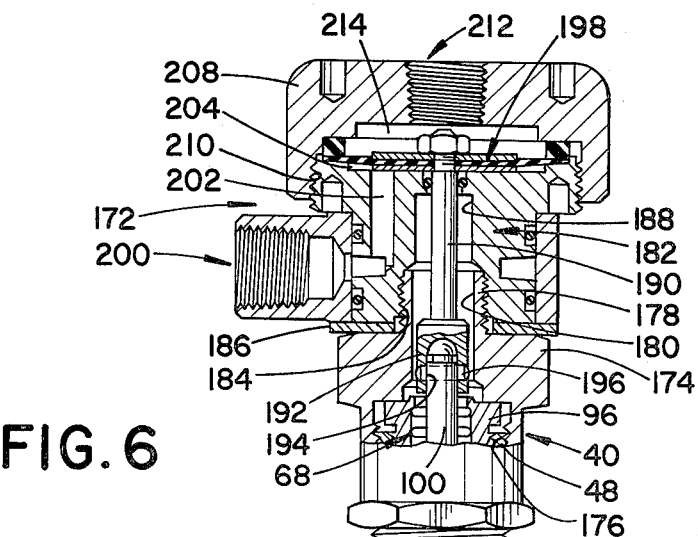
FIG. 6 is a side elevation showing a remote actuator mounted to the valve structure of FIGS. 1–5.

FIG. 6 shows the bellows valve of FIGS. 1–5 with knob or handle 160 replaced by a remote actuator arrangement generally designated 172. While this actuator may take many forms or be of several different types which do not themselves form a part of the present invention, a double acting air operated actuator has been generally shown for illustrative purposes.

In this arrangement for accommodating an actuator, the knob or handle is removed from the valve with snap ring 154, washer 152 and spring 150 removed from valve assembly B in order that a cup shaped adapter fitting 174 having an internally threaded area 176 may be threadedly received on external threads 48 of bonnet 40. An externally threaded sleeve-like area 178 extends outwardly from the adapter fitting on the other side thereof from the cup shaped portion and a bore 180 passes through area 178 into communication with the inside of the cup shaped portion. When the adapter fitting is installed on the bonnet, bore 180 is coaxial with shaft 100 in order that the shaft may be received thereinto. An actuator body 182 having a threaded cavity 184 is threadedly mounted to sleeve like area 178 with a washer member 186 advantageously disposed therebetween.

A multi-diameter bore 188 extends through the actuator body and receives an actuator rod 190 therethrough. The lowermost end of the rod includes an enlarged body area 192 having a stem receiving cavity 194 extending axially inward from the lowermost end thereof for receiving the uppermost end of elongated shaft 100. A retaining pin 196 passing through body area 192 and shaft 100 maintains these components in cooperative engagement with each other. The uppermost end of rod 190 is conveniently affixed to a diaphragm assembly generally designated 198 which is employed to selectively open and close the valve by causing translatory movement of the valve stem and valve member through rod 190. A fluid port 200 penetrates the side wall of actuator body 182 and facilitates passing air under pressure through a passage 202 to a cavity area 204 on one side of diaphragm assembly 198 for selectively moving the valve to an open position.

An actuator body cap 208 is threadedly received as at threaded area 210 onto actuator body 182. A fluid port 212 penetrates the top wall of the cap and facilitates passing air under pressure into a cavity area 214 on the other side of diaphragm assembly 198 for selectively moving the valve to a closed position.

Appropriate conventional control means (not shown) may be provided to control opening and closing of the valve as may be necessary and/or desired. While the arrangement of FIG. 6 shows a double acting air actuator, other types and styles of actuators are equally applicable to use with the subject valve development. For example, normally open and normally closed types of actuators as well as actuators other than air operated actuators could also be advantageously employed. Moreover, other means for affixing the actuator to the valve could be used for accommodating different system environments or valve applications and which other means may not necessarily require removal of snap ring 154, washer 152 and spring 150 from association with valve assembly B. Again, the specifics of the various actuator arrangements do not themselves form a part of the present invention and are not, therefore, described in any greater detail herein.

Several features of the subject now design are deemed to aid in providing a new and improved bellows valve structure. First, this design facilitates use of a soft seat type valve portion 108 which can be made from KEL-F or other soft materials compatible with a fluid system in which the valve is to be used. This then eliminates any metal to metal contact between the valve member and valve seat as has heretofore been the case for some prior bellows valve designs. One reason that metal valve members have previously been employed was simply due to the nature of construction and assembly for some prior valves. In this regard, the bellows valve arrangement shown in the commonly assigned U.S. Pat. No. 3,295,191 requires brazing or soldering closely adjacent the valve member during valve assembly. Such brazing or soldering would adversely affect the physical integrity of the soft valve portion or plug 108.

With the present bellows valve design, however, all welding, brazing or soldering required for valve assembly B can be performed prior to the time that the soft valve portion or plug type insert is inserted into sleeve-like portion 120. Moreover, and since a soft valve member is so readily employable with the subject new design, the valve is more readily adapted to use with air or other remote actuators or operators. While it was possible to employ air operators or the like with prior bellows valve designs having metal to metal contacting valve members and valve seats, it was necessary to employ oversized actuators to insure a good positive sealing relationship between the valve members and valve seat. Thus, the subject design permits use of smaller air operators or remote actuators such as that shown in FIG. 6 while still insuring good valve sealing results.

Still another advantage to the subject bellows valve is in the reduced annular sealing area between the valve assembly B and valve body A. That is, the present design provides a reduced sealing area between bonnet shoulder 44, adapter shoulder 88 and sealing ring 94. Because this sealing area or diameter is smaller than that employed in many prior bellows valves designs, it permits higher pressure ratings for the valve due to a corresponding reduction in thrust exerted at the sealing area during valve use.

Still further, bellows 68 in the subject design is inverted or reversed from prior designs over which the new valve is deemed to provide a specific improvement. That is, in the new design, fluid pressure from system fluid is exerted on the outside surface of the bellows rather than the inside. Since the bellows can withstand greater external or compressive forces than internal or tensional ones, this feature aids in allowing the valve to be useable at higher system pressures. Moreover, overall valve design permits the diameter of bellows 68 to be less than the bellows diameter of many prior valve designs for reducing the pressure load. This too aids in permitting valve use at higher fluid system pressures. Prior valves for which the subject design provides a specific improvement have been rated at 600 psi maximum whereas the subject new design has a rating of 1000 psi maximum. Moreover, prior such valves have a maximum temperature rating of 300° F. at 100 psi whereas the subject new design has a maximum temperature rating of 300° F. at 500 psi. Thus, the overall design of the subject new valve provides much improved valve capabilities over far wider pressure ranges.

Finally, the valve assembly B is such that it may be removed as a unit from cooperation with valve body A. This feature is advantageous from a valve servicing and maintenance point of view. Many prior bellows valves have incorporated such designs that rendered it very difficult and, in some instances, impossible to gain access to the valve assembly for repair or replacement purposes thereby necessitating costly repair time or replacement of the entire valve in the event of valve malfunction.

Figure 7:
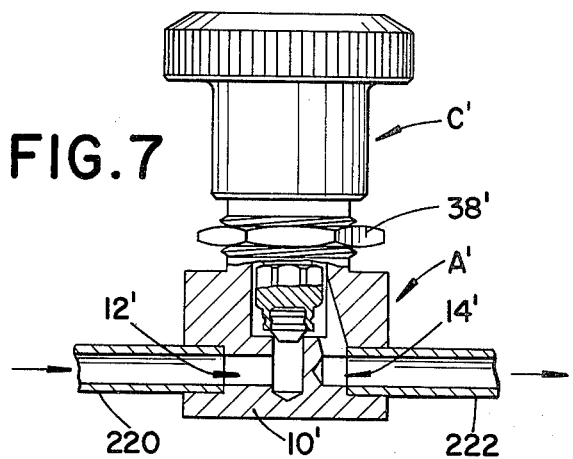
FIG. 7 is a side elevational view in partial cross-section of a slightly modified form of the valve body; and, FIG. 8 is a bottom view of the valve body shown in FIG. 7.
Figure 8:
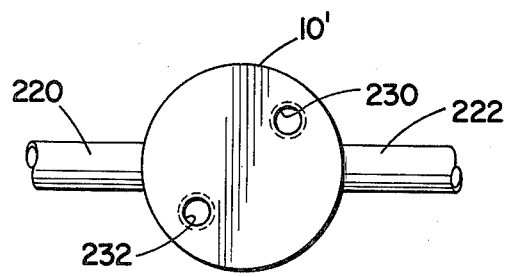

Referring now to FIGS. 7 and 8, a slight modification to the valve body is shown therein. For ease of illustration and appreciation of the changes, like components are identified by like numerals and new components are identified by new numerals. Here, a tube stub 220 is closely received in and associated with inlet passage 12' and a tube stub 222 is similarly closely received in and associated with outlet passage 14'. These tube stubs merely facilitate placement of the valve in a fluid system by other conventional means. Here also, body portion 10' of valve body A' has a generally cylindrical configuration which thereby facilitates machining of the valve body from conventional round stock. As shown in FIG. 8, suitable tapped holes 230,232 are provided in the bottom wall of the valve body to facilitate bracket mounting in the event that the panel mounting feature through use of nut 38' is not possible or feasible. The remaining features of the overall design for the FIGS. 7 and 8 embodiment are substantially the same as hereinabove previously discussed with reference to FIGS. 1-6.

The new and improved bellows valve structure has been described with reference to the preferred and alternative embodiments. Obviously, modifications and alterations will occur to others upon the reading and understanding of this specification. It is our intention to include all such modifications and alterations insofar as they come within the scope of the appended claims or the equivalents thereof.

Having thus described our development, we now claim:

1. A bellows valve comprising in combination:
   a valve body having a cylindrical passageway extending thereinto for defining a valve chamber, a valve seat disposed along said passageway having a fluid inlet communicating therewith on one side of said valve seat and a fluid outlet communicating therewith on the other side of said valve seat;
   a bonnet portion associated with said valve body and including a bonnet opening coaxially disposed with said passageway;
   a valve assembly receivable in said bonnet opening as a unit with a portion thereof extending into said valve chamber and adapted to selectively control fluid flow between said valve inlet and outlet, said valve assembly including an adapter, a valve member, a valve stem and an open ended hollow bellows;
   said adapter having inner and outer ends and being dimensioned to be closely received in said bonnet opening in a sealing relationship therewith, said adapter including an opening extending therethrough between said adapter inner and outer ends coaxial with said valve chamber;
   said valve stem extending through said adapter opening and being elongated to have an outer end spaced from said adapter outer end, said stem inner end including said valve member with said valve member being cooperable with said adapter inner end defining a maximum spaced position for said valve member from said valve seat;
   said bellows passing through at least a portion of said adapter opening and surrounding a portion of said stem, one end of said bellows being affixed to said adapter around said adapter opening adjacent said adapter outer end with the other end of said bellows being affixed to said valve stem adjacent said valve member thereby closing said adaptor opening and sealingly isolating said stem and whereby fluid passing through said valve from said inlet to said outlet exerts an external compressive force against said bellows;
   first means for at least selectively urging said stem axially outward of said adapter so that said valve member is urged axially outward from said valve chamber away from said valve seat; and,
   second means for at least selectively urging said stem axially inward of said adapter into said valve chamber for moving said valve member into engagement with said valve seat thereby closing said valve and preventing fluid flow therethrough.

2. The bellows valve as defined in claim 1 wherein said bonnet opening has a diameter greater than the diameter of said passageway with said bonnet opening and passageway merging at a radially disposed circumferential bonnet shoulder area, said adapter having an innermost portion including said inner end closely received in said passageway and an upper adapter portion closely received in said bonnet opening, said adapter innermost portion and upper portion merging at a radially disposed circumferential adapter shoulder adapted to closely mate with said bonnet shoulder, said valve further including seal means disposed between said adapter and bonnet shoulders to prevent fluid flow from said valve therepast.

3. The bellows valve as defined in claim 2 wherein said adapter comprises an adapter nut threadedly received in said bonnet opening, threaded advancement of said adapter nut causing said adapter and bonnet shoulders to compressingly engage said seal means.

4. The bellows valve as defined in claim 1 wherein said valve member includes a separate valve portion extending axially outward therefrom for selective engagement with said valve seat.

5. The bellows valve as defined in claim 4 wherein said separate valve portion is constructed from a material which is softer than said valve seat.

6. The bellows valve as defined in claim 4 wherein said valve member further includes a guide portion for guiding said valve member along said valve chamber between valve opened and closed positions.

7. The bellows valve as defined in claim 6 wherein said guide portion has a generally polygonal cross-section dimensioned to be closely slidably received in said valve chamber.

8. The bellows valve as defined in claim 1 wherein said bellows includes a first connecting flange area at said bellows one end welded to said adapter and a second connecting flange at said bellows other end welded to said valve stem adjacent said valve member.

9. The bellows valve as defined in claim 1 wherein said first urging means comprises a stem biasing means included as a part of said valve assembly and operably disposed between said adapter outer end and said stem outer end for continuously urging said stem axially outward of said adapter so that said valve member is continuously urged axially outward from said valve chamber away from said valve seat.

10. The bellows valve as defined in claim 9 wherein said second urging means comprises means for overcoming the outward biasing force of said stem biasing means and forcing said stem axially inward of said adapter into said valve chamber for moving said valve member into engagement with said valve seat.

11. The bellows valve as defined in claim 10 wherein said force means comprises an activating knob threadedly received over said bonnet portion with an area thereof disposed in driving communication with said valve stem outer end.

12. The bellows valve as defined in claim 1 wherein at least one of said first and second urging means comprises an actuator operably associated with said valve stem outer end and adapted to selectively apply an axial force to said valve stem in at least one of an outward and inward direction relative to said valve chamber for moving said valve member into at least one of a nonengaging and an engaging position with said valve seat.

13. The bellows valve as defined in claim 12 wherein one of said first and second urging means comprises an actuator and the other of said urging means comprises spring biasing means, said actuator being able to selectively overcome the force of said spring biasing means for moving said stem in said one of an inward and outward direction.

14. The bellows valve as defined in claim 1 wherein said bonnet portion is integrally formed with said valve body.

15. A bellows valve comprising in combination:
a valve body having an elongated cylindrical passageway extending thereinto for defining a valve chamber, a valve seat disposed along said passageway having a fluid inlet communicating therewith on one side of said valve seat and a fluid outlet communicating therewith on the other side of said valve seat, said valve further including a bonnet portion integrally formed therewith having a cylindrical bonnet opening of a diameter greater than the diameter of said passageway and disposed coaxial therewith, said passageway and bonnet opening defining a radially extending outwardly facing bonnet shoulder with said bonnet opening being threaded from adjacent said bonnet shoulder to the outermost end thereof;
an adapter nut having an adapter upper body portion including a threaded area adapted to be threadedly received in said bonnet opening and a nose portion adapted to be slidably received in said passageway, said adapter upper body and nose portions defining an inwardly facing radial adapter nut shoulder adapted to cooperate with said bonnet shoulder, said adapter nut further including an adapter opening therethrough coaxial with said valve body passageway;
annular seal means disposed between said bonnet and adapter nut shoulders adapted to sealingly cooperate therewith for providing a sealing relationship therebetween;
an elongated valve stem extending through and axially movable in said adapter nut opening and having an outer end spaced from the outermost end face of said adapter nut upper body portion and a stem inner end spaced at least adjacent the innermost end face of said adapter nut nose portion;
a valve member disposed at the stem inner end, said valve member including a valve seat engaging portion having a hardness less than the hardness of said valve seat, said valve member being selectively movable in response to axial stem movement between a first valve closed position with said seat engaging portion sealingly contacting said valve seat and a second valve opened position with said seat engaging portion spaced from said valve seat toward the innermost end of said adapter nut nose portion;
an open ended hollow bellows member passing through said adapter nut opening and surrounding a portion of said stem, one end of said bellows being sealingly affixed to said adapter nut about said adapter nut opening adjacent the outer end face of said adapter nut upper body portion with the other end of said bellows being affixed to said valve stem adjacent said valve member to thereby close said adapter opening and isolate said stem and whereby fluid passing through said valve exerts an external compressive force against said bellows;
first means for at least selectively urging said stem axially outward of said adapter nut such that said valve seat engaging portion is urged toward said second position; and,
second means for at least selectively urging said stem axially inward of said adapter nut from said second position into said valve chamber for moving said valve member into said first position in engagement with said valve seat thereby closing said valve and preventing fluid flow therethrough.

16. The bellows valve as defined in claim 15 wherein said valve seat engaging portion comprises a separate valve plug member retained by said valve member and disposed to extend axially outward therefrom.

17. The bellows valve as defined in claim 15 wherein said valve member further includes polygonal guide means slidably received in said valve body passageway for guiding said valve member between said first and second positions.

18. The bellows valve as defined in claim 15 wherein said bellows includes a first connecting flange area at said bellows one end welded to said adapter nut and a second connecting flange at said bellows other end welded to said valve stem adjacent said valve member.

19. The bellows valve as defined in claim 15 wherein said first urging means comprises a stem biasing means operably disposed between the outer end face of said adapter nut upper body portion and said stem outer end for continuously urging said stem axially outward of said adapter nut.

20. The bellows valve as defined in claim 19 wherein said second urging means comprises means for overcoming the outward biasing force of said stem biasing means and forcing said stem axially inward of said adapter nut.

21. The bellows valve as defined in claim 20 wherein said force means comprises an activating knob threadedly received over said bonnet portion with an area thereof disposed in driving communication with said valve stem outer end.

22. The bellows valve as defined claim 15 wherein at least one of said first and second urging means comprises an actuator operably associated with said valve stem outer end and adapted to selectively apply an axial force to said valve stem in at least one of an inward and outward direction relative to said valve body passageway for moving said seat engaging portion of said valve member into at least one of a nonengaging and an engaging position with said valve seat.

23. The bellows valve as defined in claim 22 wherein one of said first and second urging means comprises an actuator and the other of said urging means comprises spring biasing means, said actuator being able to selectively overcome the force of said spring biasing means for moving said stem in said one of an inward and outward direction.

24. A bellows valve comprising in combination:

a valve body having a cylindrical passageway extending thereinto for defining a valve chamber, a valve seat disposed along said passageway having a fluid inlet communicating therewith on one side of said valve seat and a fluid outlet communicating therewith on the other side of said valve seat;

a bonnet portion associated with said valve body including a bonnet opening coaxially disposed with said passageway;

a valve assembly associated as a unit in a fluid sealing relationship with said bonnet opening and having a portion thereof extending into said valve chamber adapted to selectively control fluid flow between said valve inlet and outlet, said valve assembly including an adapter, a valve member, a valve stem and an open ended hollow bellows;

said adapter having inner and outer ends and dimensioned to have at least a longitudinal portion thereof received in said body passageway, said adapter including an opening extending therethrough between said adapter inner and outer ends coaxial with said valve chamber;

said valve stem extending through said adapter opening and being elongated to have an outer end spaced from said adapter outer end, the inner end of said stem including said valve member with said valve member being cooperable with said adapter inner end for defining a maximum spaced position for said valve member from said seat;

said bellows surrounding at least a portion of said stem with one end of said bellows being affixed to said valve assembly adjacent said adapter outer end at an area of said valve assembly other than said stem with the other end of said bellows affixed to said stem for sealingly closing said valve assembly and preventing fluid flow outwardly thereof about said stem; and, means for selectively longitudinally reciprocating said stem to move said valve member into and out of sealing engagement with said valve seat for controlling fluid flow between said valve inlet and outlet.

25. The bellows valve as defined in claim 24 further including means for retaining said valve assembly in a sealing relationship with said bonnet opening.

26. The bellows valve as defined in claim 25 wherein said bonnet opening has a diameter greater than the diameter of said passageway with said bonnet opening and passageway merging at a radially disposed circumferential bonnet shoulder area, said valve assembly including a shoulder dimensioned to closely mate with said bonnet shoulder area, said bellows valve further including seal means interposed between said bonnet shoulder area and said valve assembly shoulder.

27. The bellows valve as defined in claim 24 wherein said bellows includes a first connecting flange area at said bellows one end welded to said valve assembly adjacent said adapter outer end and a second connecting flange at said bellows other end welded to said valve stem.

28. The bellows valve as defined in claim 24 wherein said reciprocating means comprises spring biasing means operably engaging said valve stem for continuously urging the stem axially outward of said adapter opening so that said valve member is moved out of engagement with said valve seat and a handle member threadedly associated with said bonnet in driving communication with said valve stem outer end for selectively overcoming the force of said spring biasing means and forcing the stem axially inward of said adapter opening so that said valve member is moved into sealing engagement with said valve seat.

29. The bellows valve as defined in claim 24 wherein said reciprocating means comprises an actuator operably associated with said valve stem outer end, said actuator adapted to selectively apply opposed forces to said valve stem longitudinally thereof for moving said valve member into and out of sealing engagement with said valve seat.

30. The bellows valve as defined in claim 24 wherein said valve body includes a pair of at least one of said inlet and outlet, said pair separately communicating with said valve body passageway on opposite sides of said valve seat and adapted to be separately placed in fluid communication with the other of said inlet and outlet, one of said pair being in fluid communication with the other of said inlet and outlet when said valve member is in sealing engagement with said seat and the other of said pair being in fluid communication with said other of said inlet and outlet when said valve member is retracted from engagement with said valve seat.

* * * * *